United States Patent
Jiang

(10) Patent No.: US 11,218,990 B2
(45) Date of Patent: Jan. 4, 2022

(54) METHOD AND APPARATUS FOR RECEIVING AND SENDING SYSTEM INFORMATION, USER EQUIPMENT AND BASE STATION

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 81 days.

(21) Appl. No.: 16/612,493

(22) PCT Filed: May 12, 2017

(86) PCT No.: PCT/CN2017/084203
§ 371 (c)(1),
(2) Date: Nov. 11, 2019

(87) PCT Pub. No.: WO2018/205279
PCT Pub. Date: Nov. 15, 2018

(65) Prior Publication Data
US 2020/0128510 A1    Apr. 23, 2020

(51) Int. Cl.
*H04W 72/00* (2009.01)
*H04W 4/06* (2009.01)
(Continued)

(52) U.S. Cl.
CPC .......... *H04W 72/005* (2013.01); *H04W 4/06* (2013.01); *H04W 24/08* (2013.01); *H04W 72/1273* (2013.01)

(58) Field of Classification Search
CPC ..... H04W 72/005; H04W 4/06; H04W 24/08; H04W 72/1273; H04W 48/14; H04W 72/1263; H04L 12/189
See application file for complete search history.

(56) References Cited

U.S. PATENT DOCUMENTS

2009/0185543 A1* 7/2009 Chen ............... H04W 48/08
                                                           370/338
2010/0214995 A1   8/2010 Iyer et al.
(Continued)

FOREIGN PATENT DOCUMENTS

CN    102318409 A    1/2012
CN    104661052 A    5/2015
(Continued)

OTHER PUBLICATIONS

State Intellectual Property Office of the People's Republic of China, Office Action and Search Report Issued in Application No. 201780000373.0, dated Sep. 1, 2020, 16 pages, (Submitted with Machine Translation).
(Continued)

*Primary Examiner* — Peter P Chau
(74) *Attorney, Agent, or Firm* — Syncoda LLC; Feng Ma

(57) ABSTRACT

A method of receiving system information (SI) includes: a first SI request for requesting a base station to broadcast at least one piece of to-be-requested SI is sent to the base station, where the at least one piece of the to-be-requested SI belongs to second type, not broadcasted SI; the at least one piece of the to-be-requested SI broadcasted by the base station in response to the first SI request is received according to pre-acquired scheduling information; upon determining that any of one or more pieces of to-be-requested SI is not successfully received, a second SI request for requesting the base station to unicast the to-be-requested SI not successfully received by present UE is sent to the base station; and the to-be-requested SI not successfully received by the present UE, which is unicasted by the base station in response to the second SI request, is received.

16 Claims, 13 Drawing Sheets

(51) Int. Cl.
*H04W 24/08* (2009.01)
*H04W 72/12* (2009.01)

(56) References Cited

U.S. PATENT DOCUMENTS

| | | | |
|---|---|---|---|
| 2013/0089008 A1 | 4/2013 | Li et al. | |
| 2013/0163444 A1 | 6/2013 | Tee et al. | |
| 2013/0215813 A1 | 8/2013 | Kotecha et al. | |
| 2014/0315549 A1* | 10/2014 | Zhang | H04W 48/08 455/434 |
| 2014/0358866 A1 | 12/2014 | Gholmieh et al. | |
| 2018/0199266 A1* | 7/2018 | Pantelidou | H04W 72/0446 |
| 2018/0288748 A1* | 10/2018 | Horn | H04W 72/042 |
| 2019/0037479 A1* | 1/2019 | Suzuki | H04W 72/0446 |
| 2019/0053131 A1* | 2/2019 | Suzuki | H04W 8/24 |
| 2019/0150071 A1* | 5/2019 | Lee | H04W 36/08 370/328 |
| 2019/0253956 A1* | 8/2019 | Fujishiro | H04W 72/005 |
| 2020/0008223 A1* | 1/2020 | Yang | H04W 72/1289 |

FOREIGN PATENT DOCUMENTS

| | | |
|---|---|---|
| CN | 106664660 A | 5/2017 |
| EP | 0959635 A1 | 11/1999 |

OTHER PUBLICATIONS

European Patent Office, Office Action Issued in Application No. 17909058.4, dated Dec. 9, 2020, Germany, 6 pages.
European Patent Office, Extended European Search Report Issued in Application No. 17909058.4, dated Mar. 13, 2020, Germany, 9 pages.
Media Tek Inc., "Error Handling for On Demand SI Delivery", 3GPP TSG-RAN WG2 Meeting #98, R2-1705438, May 15-19, 2017, 6 pages.
Huawei et al., "Delivery of "Other SI" in NR", 3GPP TSG-RAN2 Meeting #95bis, R2-166203, Oct. 10-14, 2016, 6 pages.
Intel Corporation,"On demand SI delivery procedure", 3GPP TSG-RAN WG2 NR AdHoc Meeting Spokane, R2-1700340, Jan. 17-19, 2017, 2 pages.
ISA State Intellectual Property Office of the People's Republic of China, Written Opinion of the International Searching Authority Issued in Application No. PCT/CN2017/084203, dated Feb. 24, 2018, WIPO, 3 pages.
ISA State Intellectual Property Office of the People's Republic of China, International Search Report Issued in Application No. PCT/CN2017/084203, dated Feb. 24, 2018, WIPO, 4 pages.
Huawei et al., "Design on MSGI Based Request and Failure Handling", R2-1705175, 3GPP TSG-RAN WG2#98, May 6, 2017, 3 pages.
Catt, "Procedures of on Demand Si Delivery and Error Handling", R2-1704236, 3GPP TSG-RAN WG2 Meeting#98, May 6, 2017, 5 pages.
Ericsson, "Remaining Issues of On-Demand SI", R2-1704385, 3GPP TSG-RAN WG2#98, May 6, 2017, 7 pages.
Mediatek Inc., "NR SI Unicast", R2-1701362, 3GPP TSG-RAN2#97 Meeting, Feb. 3, 2017, 6 pages.
3rd Generation Partnership Project; Technical Specification Group Radio Access Network; Evolved Universal Terrestrial Radio Access (E-UTRA); Medium Access Control (MAC) protocol specification; 3GPP TS 36.321 V15.4.0 (Dec. 2018).
3rd Generation Partnership Project; Technical Specification Group Radio Access Network; Evolved Universal Terrestrial Radio Access (E-UTRA); Radio Resource Control (RRC); Protocol specification; 3GPP TS 36.331 V15.4.0 (Dec. 2018).
State Intellectual Property Office of the People's Republic of China, Office Action and Search Report Issued in Application No. 2017800003730, dated Mar. 19, 2021, 12 pages, (Submitted with Machine Translation).
Indian Patent Office, Office Action Issued in Application No. 201947051180, dated Mar. 16, 2021, 7 pages.
European Patent Office, Oral Proceedings Issued in Application No. 17909058.4, dated Aug. 26, 2021, Germany, 8 pages.
"3rd Generation Partnership Project; Technical Specification Group Radio Access Network; Study on New Radio (NR) access technology (Release 14)", 3GPP Standard; Technical Specification; Mobile Competence Centre; France, Mar. 24, 2017, 74 pages.

* cited by examiner

METHOD AND APPARATUS FOR RECEIVING AND SENDING SYSTEM INFORMATION, USER EQUIPMENT AND BASE STATION

CROSS-REFERENCE TO RELATED APPLICATION

This application is a national stage of International Application No. PCT/CN2017/084203 filed on May 12, 2017, the disclosure of which is hereby incorporated by reference in its entirety.

TECHNICAL FIELD

The present disclosure relates to the field of communication technology, and in particular, to a method and apparatus for receiving and sending system information, user equipment, and a base station.

BACKGROUND

With rapid development of wireless communication technology, a number of System Information (SI) of Long-Term Evolution (LTE) is increasing. Sending the SI of LTE by means of periodical broadcasting may lead to large power consumption of a base station and a low utilization rate of a spectrum resource. In a case of a small quantity of accessing User Equipment (UE), a resource waste problem may occur when the SI of LTE is periodical broadcasted. To alleviate the problems of the resource waste and large power consumption of the base station caused by broadcasting the SI of LTE, operators begin to consider solving the above problems by means of broadcasting the SI according to classification In the related art, during research and discussion on the $5^{th}$ Generation (5G) mobile communication technology project, the SI may be divided into first type SI and second type SI. The first type SI may include SI relating to cell selection and cell access, and the second type SI may include SI other than the first type SI. In the related art, the first type SI may be sent by broadcasting, and the second type SI may be broadcasted or unicasted based on a request of UE.

After the UE requests the base station to broadcast the SI, the base station may not broadcast the SI in a corresponding sending window, or the UE fails to successfully receive the SI.

SUMMARY

In view of this, a method, an apparatus for receiving and sending SI, UE, and a base station are disclosed by the present application, so that the UE, upon un-successfully receiving SI broadcasted by the base station, can acquire the SI in a unicast manner.

According to a first aspect of examples of the present disclosure, a method of receiving SI is provided, including:

sending a first SI request to a base station, where the first SI request is for requesting the base station to broadcast at least one piece of to-be-requested SI, and the at least one piece of the to-be-requested SI belongs to second type SI which has not been broadcasted;

receiving, according to pre-acquired scheduling information, the at least one piece of the to-be-requested SI broadcasted by the base station in response to the first SI request;

when it is determined that any of one or more pieces of the to-be-requested SI is not successfully received, sending a second SI request to the base station, where the second SI request is for requesting the base station to unicast to-be-requested SI not successfully received by present UE; and receiving the to-be-requested SI not successfully received by the present UE, which is unicasted by the base station in response to the second SI request.

In an example, the method further includes:

receiving first type SI broadcasted by the base station, where the first type SI carries the second type SI which has not been broadcasted.

In an example, the scheduling information includes a position of an initial monitoring window and a number-of-windows, and receiving, according to the pre-acquired scheduling information, the at least one piece of the to-be-requested SI broadcasted by the base station in response to the first SI request includes:

for each piece of the to-be-requested SI, continuously monitoring a number-of-windows of receiving windows corresponding to the piece of the to-be-requested SI from an initial monitoring window corresponding to a position of an initial monitoring window for the piece of the to-be-requested SI; and when the piece of the to-be-requested SI is not received within the receiving windows continuously monitored, determining that the piece of the to-be-requested SI is not successfully received.

In an example, the scheduling information further includes a number-of-requests threshold, and receiving, according to the pre-acquired scheduling information, the at least one piece of the to-be-requested SI broadcasted by the base station in response to the first SI request includes:

after determining that the piece of the to-be-requested SI is not successfully received, sending a third SI request to the base station and recording a number of requests, where the third SI request is for requesting the base station to broadcast the piece of the to-be-requested SI;

continuously monitoring the number-of-windows of receiving windows corresponding to the piece of the to-be-requested SI from the initial monitoring window corresponding to the position of the initial monitoring window for the piece of the to-be-requested SI;

when the recorded number of requests does not reach the number-of-requests threshold and the piece of the to-be-requested SI is not received within the receiving windows continuously monitored, repeatedly performing the operation of sending the third SI request to the base station; and when the recorded number of requests reaches the number-of-requests threshold and the piece of the to-be-requested SI is not received yet within the receiving windows continuously monitored, determining that the piece of the to-be-requested SI is not successfully received.

In an example, the scheduling information further includes a number-of-decoding-failures threshold, and receiving, according to the pre-acquired scheduling information, the at least one piece of the to-be-requested SI broadcasted by the base station in response to the first SI request includes:

when the piece of the to-be-requested SI is received within the receiving windows continuously monitored, decoding the piece of the to-be-requested SI within a corresponding receiving window; and counting failures of decoding the piece of the to-be-requested SI within the corresponding receiving window and, when the number of the failures reaches the number-of-decoding-failures threshold, determining that the piece of the to-be-requested SI is not successfully received.

In an example, the first type SI further carries indication information including at least one of:

a respective number-of-requests corresponding to each piece of the second type SI, indicated uniformly or separately;

a respective number-of-monitoring-windows corresponding to each piece of the second type SI, indicated uniformly or separately;

a respective number-of-decoding-failures corresponding to each piece of the second type SI, indicated uniformly or separately; or second type SI that can be converted to be unicasted.

In an example, the number-of-windows is agreed by the base station and the present UE or is equal to the number-of-monitoring-windows in the indication information; the number-of-requests threshold is agreed by the base station and the present UE or is equal to the number-of-requests in the indication information; and the number-of-decoding-failures threshold is agreed by the base station and the present UE or is equal to the number-of-decoding-failures in the indication information.

In an example, when the indication information includes the second type SI that can be converted to be unicasted, prior to sending the second SI request to the base station, the method further includes:

confirming that the to-be-requested SI not successfully received by the present UE belongs to the second type SI that can be converted to be unicasted.

According to a second aspect of the examples of the present disclosure, a method of sending SI is provided, including:

receiving a first SI request sent by UE, where the first SI request is for the UE to request the present base station to broadcast at least one piece of to-be-requested SI, and the at least one piece of the to-be-requested SI belongs to second type SI which has not been broadcasted by the present base station;

broadcasting the at least one piece of the to-be-requested SI to the UE in response to the first SI request;

receiving a second SI request, which is sent by the UE after the UE determines that any of one or more pieces of to-be-requested SI is not successfully received, where the second SI request is for the UE to request the base station to unicast the to-be-requested SI not successfully received by the UE; and unicasting, to the UE, the to-be-requested SI not successfully received by the UE, in response to the second SI request.

In an example, the method further includes:

broadcasting, to the UE, first type SI carrying the second type SI which has not been broadcasted by the present base station.

In an example, the first type SI further carries indication information including at least one of:

a respective number-of-requests corresponding to each piece of the second type SI, indicated uniformly or separately;

a respective number-of-monitoring-windows corresponding to each piece of the second type SI, indicated uniformly or separately;

a respective number-of-decoding-failures corresponding to each piece of the second type SI, indicated uniformly or separately; or second type SI that can be converted to be unicasted.

According to a third aspect of the examples of the present disclosure, an apparatus for receiving SI is provided, including:

a first sending module configured to send a first SI request to a base station, where the first SI request is for requesting the base station to broadcast at least one piece of to-be-requested SI, and the at least one piece of the to-be-requested SI belongs to second type SI which has not been broadcasted;

a first receiving module configured to receive, according to pre-acquired scheduling information, the at least one piece of the to-be-requested SI broadcasted by the base station in response to the first SI request send by the first receiving module;

a second sending module configured to, after the first receiving module receives the at least one piece of the to-be-requested SI, when it is determined that any of one or more pieces of the to-be-requested SI is not successfully received, send a second SI request to the base station, where the second SI request is for requesting the base station to unicast to-be-requested SI not successfully received by present UE; and a second receiving module configured to receive the to-be-requested SI not successfully received by the present UE, which is unicasted by the base station in response to the second SI request sent by the second sending module.

In an example, the apparatus further includes:

a third receiving module configured to, before the first sending module sends the first SI request, receive first type SI broadcasted by the base station, where the first type SI carries the second type SI which has not been broadcasted.

In an example, the scheduling information includes a position of an initial monitoring window and a number-of-windows, and the first receiving module includes:

a first monitoring sub-module configured to, for each piece of the to-be-requested SI, continuously monitor a number-of-windows of receiving windows corresponding to the piece of the to-be-requested SI from an initial monitoring window corresponding to a position of an initial monitoring window for the piece of the to-be-requested SI; and a first determining sub-module configured to, when the piece of the to-be-requested SI is not received by the first monitoring sub-module within the receiving windows continuously monitored, determine that the piece of the to-be-requested SI is not successfully received.

In an example, the scheduling information further includes a number-of-requests threshold, and the first receiving module further includes:

a sending and recording sub-module configured to, after the first determining sub-module determines that the piece of the to-be-requested SI is not successfully received, send a third SI request to the base station and record a number of requests, where the third SI request is for requesting the base station to broadcast the piece of the to-be-requested SI;

a second monitoring sub-module configured to continuously monitor the number-of-windows of receiving windows corresponding to the piece of the to-be-requested SI from the initial monitoring window corresponding to the position of the initial monitoring window for the piece of the to-be-requested SI;

an invoking sub-module configured to, when the number of requests recorded by the sending and recording sub-module does not reach the number-of-requests threshold and the piece of the to-be-requested SI is not received by the second monitoring sub-module within the receiving windows continuously monitored, invoke the sending and recording sub-module to send the third SI request to the base station repeatedly; and a second determining sub-module configured to, when the number of requests recorded by the sending and recording sub-module reaches the number-of-requests threshold and the piece of the to-be-requested SI is not received yet by the second monitoring sub-module within the receiving windows continuously monitored, determine that the piece of the to-be-requested SI is not successfully received.

In an example, the scheduling information further includes a number-of-decoding-failures threshold, and the first receiving module further includes:

a decoding sub-module configured to, when the piece of the to-be-requested SI is received within the receiving windows continuously monitored, decode the piece of the to-be-requested SI within a corresponding receiving window; and a counting and determining sub-module configured to count failures of decoding the piece of the to-be-requested SI within the corresponding receiving window by the decoding sub-module and, when the number of the failures reaches the number-of-decoding-failures threshold, determine that the piece of the to-be-requested SI is not successfully received.

In an example, the first type SI further carries indication information including at least one of:

a respective number-of-requests corresponding to each piece of the second type SI, indicated uniformly or separately;

a respective number-of-monitoring-windows corresponding to each piece of the second type SI, indicated uniformly or separately;

a respective number-of-decoding-failures corresponding to each piece of the second type SI, indicated uniformly or separately; or second type SI that can be converted to be unicasted.

In an example, the number-of-windows is agreed by the base station and the present UE or is equal to the number-of-monitoring-windows in the indication information; the number-of-requests threshold is agreed by the base station and the present UE or is equal to the number-of-requests in the indication information; and the number-of-decoding-failures threshold is agreed by the base station and the present UE or is equal to the number-of-decoding-failures in the indication information.

In an example, when the indication information includes the second type SI that can be converted to be unicasted, the apparatus further includes:

a confirming module configured to, before the second sending module sends the second SI request to the base station, confirm that the to-be-requested SI not successfully received by the present UE belongs to the second type SI that can be converted to be unicasted.

According to a fourth aspect of the examples of the present disclosure, an apparatus for sending SI is provided, including:

a first receiving module configured to receive a first SI request sent by UE, where the first SI request is for the UE to request the present base station to broadcast at least one piece of to-be-requested SI, and the at least one piece of the to-be-requested SI belongs to second type SI which has not been broadcasted by the present base station;

a first sending module configured to broadcast the at least one piece of the to-be-requested SI to the UE in response to the first SI request received by the first receiving module;

a second receiving module configured to receive a second SI request, which is sent by the UE after the UE determines that any of one or more pieces of to-be-requested SI which is sent by the first sending module is not successfully received, where the second SI request is for the UE to request the base station to unicast the to-be-requested SI not successfully received by the UE; and a second sending module configured to unicast, to the UE, the to-be-requested SI not successfully received by the UE, in response to the second SI request received by the second receiving module.

In an example, the apparatus further includes:

a third sending module configured to, before the first receiving module receives the first SI request, broadcast, to the UE, first type SI carrying the second type SI which has not been broadcasted by the present base station.

In an example, the first type SI further carries indication information including at least one of:

a respective number-of-requests corresponding to each piece of the second type SI, indicated uniformly or separately;

a respective number-of-monitoring-windows corresponding to each piece of the second type SI, indicated uniformly or separately;

a respective number-of-decoding-failures corresponding to each piece of the second type SI, indicated uniformly or separately; or second type SI that can be converted to be unicasted.

According to a fifth aspect of the examples of the present disclosure, UE is provided, including:

a processor; and a memory storing instructions executable by the processor;

where the processor is configured to:

send a first SI request to a base station, where the first SI request is for requesting the base station to broadcast at least one piece of to-be-requested SI, and the at least one piece of the to-be-requested SI belongs to second type SI which has not been broadcasted;

receive, according to pre-acquired scheduling information, the at least one piece of the to-be-requested SI broadcasted by the base station in response to the first SI request;

when it is determined that any of one or more pieces of the to-be-requested SI is not successfully received, sending a second SI request to the base station, where the second SI request is for requesting the base station to unicast to-be-requested SI not successfully received by the UE; and receive the to-be-requested SI not successfully received by the UE, which is unicasted by the base station in response to the second SI request.

According to a sixth aspect of the examples of the present disclosure, there is provided a base station, including:

a processor; and a memory storing instructions executable by the processor;

where the processor is configured to:

receive a first SI request sent by UE, where the first SI request is for the UE to request the present base station to broadcast at least one piece of to-be-requested SI, and the at least one piece of the to-be-requested SI belongs to second type SI which has not been broadcasted by the base station;

broadcast the at least one piece of the to-be-requested SI to the UE in response to the first SI request;

receive a second SI request, which is sent by the UE after the UE determines that any of one or more pieces of to-be-requested SI is not successfully received, where the second SI request is for the UE to request the base station to unicast the to-be-requested SI not successfully received by the UE; and unicast, to the UE, the to-be-requested SI not successfully received by the UE, in response to the second SI request.

According to a seventh aspect of the examples of the present disclosure, a computer-readable storage medium is provided, the storage medium storing a computer program that, when executed by a processor, cause the processor to implement the method of receiving SI according to claim 1.

According to an eighth aspect of the examples of the present disclosure, a computer-readable storage medium is provided, the storage medium storing a computer program that, when executed by a processor, cause the processor to implement the method of sending SI according to claim 9.

The technical solutions provided by the examples of the present disclosure may include the following beneficial effects:

After it is determined that any of one or more pieces of the to-be-requested SI is not successfully received, the second SI request is sent to the base station, so that the base station can unicast the to-be-requested SI not successfully received by the present UE in response to the second SI request. Thus, the UE can successfully acquire the corresponding to-be-requested SI.

It should be understood that the above general description and the following detailed description are only exemplary and explanatory, and are not restrictive of the present disclosure.

DETAILED DESCRIPTION

The technical solutions in examples of the present application are clearly and completely described below with reference to the drawings in the examples of the present application. It is obvious that the described examples are only a part but are not all of the examples of the present application. All other examples obtained by those of ordinary skill in the art based on the examples of the present application without involving inventive work fall within the protection scope of the present application.

Figure 1:
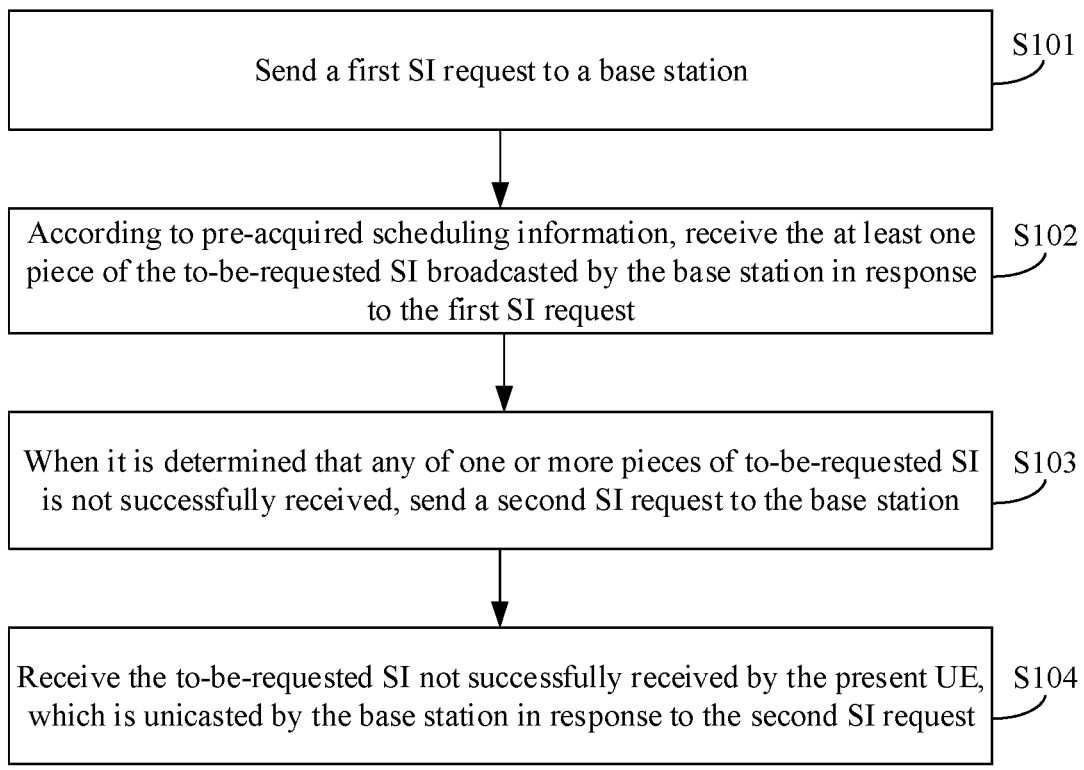
FIG. 1 is a flowchart illustrating a method of receiving SI according to an example of the present application.

FIG. 1 is a flowchart illustrating a method of receiving SI according to an example of the present application, which is described from a UE side. As shown in FIG. 1, the method of receiving the SI includes the followings.

At step S101, a first SI request is sent to a base station, where the first SI request is for requesting the base station to broadcast at least one piece of to-be-requested SI, and the at least one piece of the to-be-requested SI belongs to second type SI which has not been broadcasted.

Figure 2:
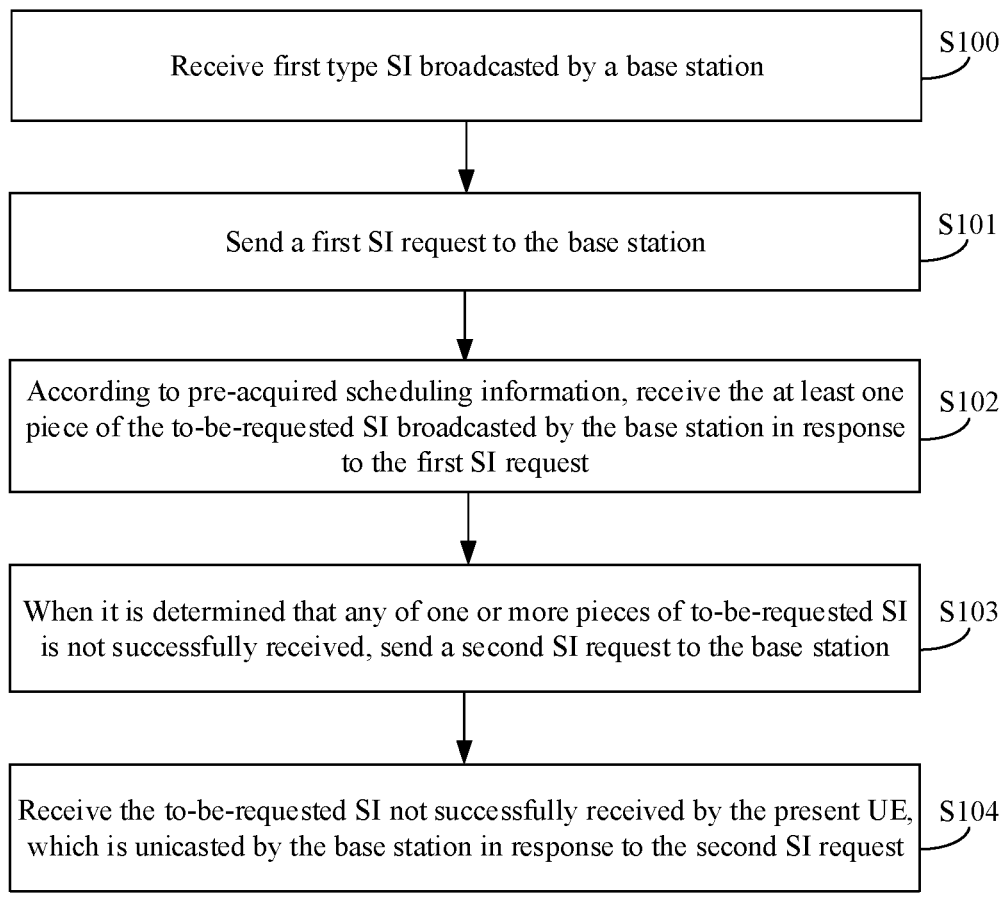
FIG. 2 is a flowchart illustrating another method for receiving SI according to an example of the present application.

In the example, as shown in FIG. 2, prior to performing step S101, the method may further include:

at step S100, first type SI broadcasted by the base station is received, where the first type SI carries the second type SI which has not been broadcasted.

In the example, the first type SI may be Minimum SI, and the second type SI may be one or more pieces of SI other than the Minimum SI, e.g., other SI. The base station may carry the second type SI which has not been broadcasted in the first type SI, where the first type SI is broadcasted by the base station. Thus, when the UE is to acquire one or some pieces of the second type SI that are not broadcasted, the UE can send the first SI request to the base station for requesting the base station to broadcast at least one piece of to-be-requested SI.

In addition, the first type SI may further carry indication information. The indication information may include at least one of the followings: a respective number-of-requests corresponding to each piece of the second type SI, indicated uniformly or separately; a respective number-of-monitoring-windows corresponding to each piece of the second type SI, indicated uniformly or separately; a respective number-of-decoding-failures corresponding to each piece of the second type SI, indicated uniformly or separately; or the second type SI that can be converted to be unicasted.

At step S102, the at least one piece of to-be-requested SI broadcasted by the base station in response to the first SI request is received according to pre-acquired scheduling information.

The UE can acquire scheduling information in a manner of agreement with the base station, and based on the scheduling information, receive the at least one piece of to-be-requested SI which is broadcasted by the base station in response to the first SI request.

At step S103, when it is determined that any of one or more pieces of to-be-requested SI is not successfully received, a second SI request is sent to the base station, where the second SI request is for requesting the base station to unicast to-be-requested SI not successfully received by the present UE.

If the UE fails to successfully receive any of one or more pieces of to-be-requested SI, the second SI request can be sent to the base station for requesting the base station to unicast the to-be-requested SI which is not successfully received by the present UE. The UE may carry the second SI request in a connection establishment request sent to the base station, or carry the second SI request in a preamble sequence sent to the base station.

In the example, the second SI request may indicate the base station to send the to-be-requested SI in a unicast manner. For example, each piece of the to-be-requested SI may be separately indicated for sending in the unicast manner, or all pieces of the to-be-requested SI may be uniformly indicated for sending in the unicast manner.

In addition, if the indication information includes second type SI that can be converted to be unicasted, the UE is to confirm whether the to-be-requested SI which is not successfully received by the present UE belongs to the second type SI that can be converted to be unicasted, and if the to-be-requested SI which is not successfully received by the present UE belongs to the second type SI that can be converted to be unicasted, the second SI request may be sent to the base station.

At step S104, the to-be-requested SI not successfully received by the present UE is received, which is unicasted by the base station in response to the second SI request.

After receiving the second SI request carried in the preamble sequence or the connection establishment request from the UE, the base station can send the UE the to-be-requested SI which is not successfully received by the present UE in a corresponding response message.

In the example, after it is determined that any of one or more pieces of to-be-requested SI broadcasted by the base station is not successfully received, the second SI request is sent to the base station, so that the base station can unicast to-be-requested SI not successfully received by the present UE in response to the second SI request, and the UE may thereby successfully acquire the corresponding to-be-requested SI.

Figure 3:
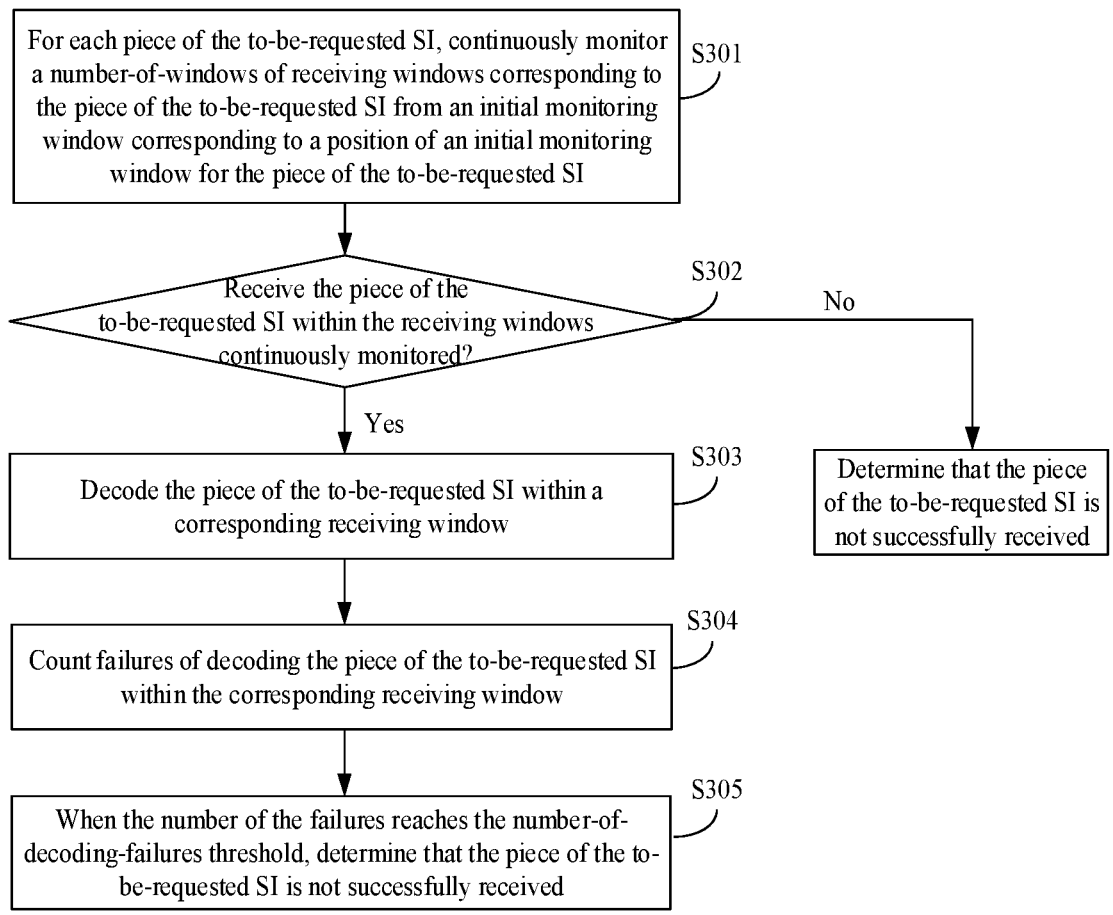
FIG. 3 is a flowchart illustrating receiving at least one piece of to-be-requested SI broadcasted by a base station based on scheduling information according to an example of the present application.

FIG. 3 is a flowchart illustrating receiving at least one piece of to-be-requested SI broadcasted by a base station based on scheduling information according to an example of the present application. In the example, the scheduling information may include a position of an initial monitoring window and a number-of-windows. As shown in FIG. 3, a process of receiving the at least one piece of the to-be-requested SI broadcasted by the base station based on the scheduling information can include the followings.

At step S301, for each piece of the to-be-requested SI, a number-of-windows of receiving windows corresponding to the piece of the to-be-requested SI are continuously monitored, and monitor is started from an initial monitoring window corresponding to a position of an initial monitoring window of the piece of the to-be-requested SI.

For each piece of SI, a position of an initial monitoring window and a number-of-windows may be agreed by the UE and the base station.

In addition, if the first type SI carries the indication information, the number-of-windows may be equal to the number-of-monitoring-windows in the indication information.

It is assumed that the to-be-requested SI includes SI 1 and SI 2, and the number-of-windows is 5. For SI 1, 5 receiving windows may be continuously monitored from an initial monitoring window corresponding to a position of an initial monitoring window of SI 1. For SI 2, 5 receiving windows may be continuously monitored from an initial monitoring window corresponding to a position of an initial monitoring window of SI 2.

At step S302, it is determined whether the piece of the to-be-requested SI is received within the receiving windows continuously monitored. If the piece of the to-be-requested SI is not received within the receiving windows continuously monitored, it is determined that the piece of the to-be-requested SI is not successfully received. If the piece of the to-be-requested SI is received within the receiving windows continuously monitored, proceed to step S303.

The description continues based on the above example. If SI 1 is not received within 5 receiving windows, it is determined that SI 1 is not successfully received. If SI 2 is not received within 5 receiving windows, it is determined that SI 2 is not successfully received.

At step S303, the piece of the to-be-requested SI is decoded in a corresponding receiving window.

At step S304, a number-of-decoding-failures for the piece of the to-be-requested SI in the corresponding receiving window is counted.

At step S305, when the number-of-decoding-failures reaches a number-of-decoding-failures threshold, it is determined that the piece of the to-be-requested SI is not successfully received.

It should be noted that steps S303 to S305 are optional steps. If the process includes steps S303 to S305, the scheduling information may further include the number-of-decoding-failures threshold. The number-of-decoding-failures threshold may be agreed by the UE and the base station. In addition, if the indication information is carried in the first type SI, the number-of-decoding-failures threshold may be equal to the number-of-decoding-failures in the indication information.

According to the example, the to-be-requested SI is received by the receiving windows continuously monitored. If the to-be-requested SI is not successfully received, the second SI request is sent to the base station for requesting the base station to unicast the corresponding SI, thereby improving a success rate of receiving. In addition, the number-of-decoding-failures for a piece of the to-be-requested SI in the corresponding receiving window may be counted, and when the number-of-decoding-failures reaches the number-of-decoding-failures threshold, it is determined that the piece of the to-be-requested SI is not successfully received. In this way, the second SI request is sent to the base station for requesting the base station to unicast the corresponding SI, thereby improving the success rate of receiving.

Figure 4:
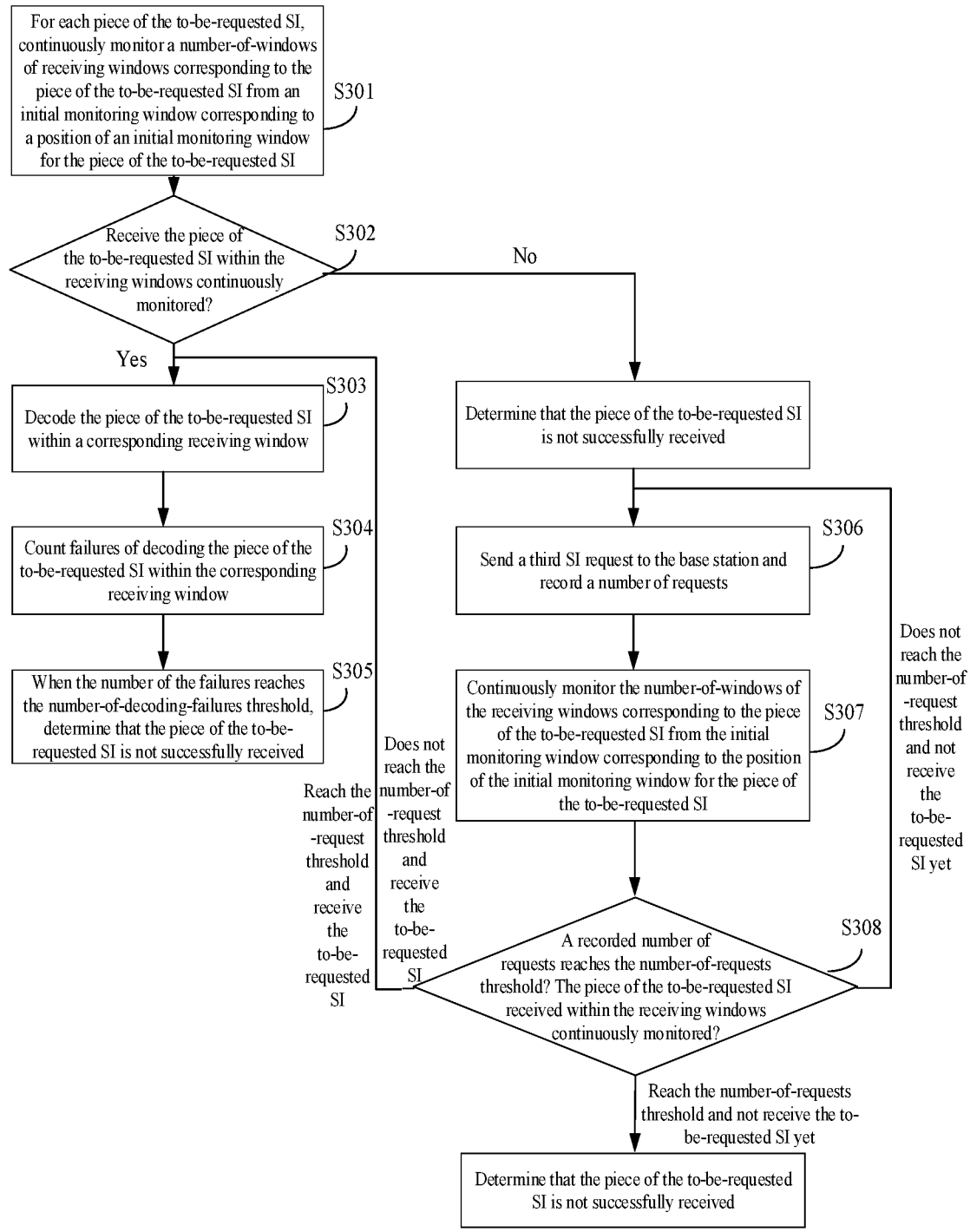
FIG. 4 is another flowchart illustrating receiving at least one piece of to-be-requested SI broadcasted by a base station based on scheduling information according to an example of the present application.

FIG. 4 is another flowchart illustrating receiving at least one piece of to-be-requested SI broadcasted by a base station based on scheduling information according to an example of the present application. In the example, the scheduling information may further include a number-of-requests threshold. As shown in FIG. 4, after it is determined that the piece of the to-be-requested SI is not successfully received in the above step S302, receiving the at least one piece of the to-be-requested SI broadcasted by the base station according to the scheduling information may further include the followings.

At step S306, a third SI request is sent to the base station, and a number of requests is recorded, where the third SI request is for requesting the base station to broadcast the piece of the to-be-requested SI.

At step S307, the number-of-windows of the receiving windows corresponding to the piece of the to-be-requested SI are continuously monitored, monitor is started from the initial monitoring window corresponding to the position of the initial monitoring window of the piece of the to-be-requested SI.

At step S308, it is determined whether a recorded number of requests reaches the number-of-requests threshold and whether the piece of the to-be-requested SI is received within the receiving windows continuously monitored. If the recorded number of requests does not reach the number-of-requests threshold and the piece of the to-be-requested SI is not received within the receiving windows continuously monitored, proceed to step S306. If the recorded number of requests does not reach the number-of-requests threshold and the piece of the to-be-requested SI is received within the receiving windows continuously monitored, proceed to step S303. If the recorded number of requests reaches the number-of-requests threshold and the piece of the to-be-requested SI is not received within the receiving windows continuously monitored yet, it is determined that the piece of the to-be-requested SI is not successfully received. If the recorded number of requests reaches the number-of-requests threshold and the piece of the to-be-requested SI is received within the receiving windows continuously monitored, proceed to step S303.

The number-of-requests threshold may be agreed by the UE and the base station.

In addition, if the indication information is carried in the first type SI, the number-of-requests threshold may be equal to the number-of-requests in the indication information.

In the example, the third SI request is sent to the base station and the to-be-requested SI is received by continuously monitoring the receiving windows. Thus, if the number of requests reaches the number-of-requests threshold and the to-be-requested SI is still not successfully received, the second SI request is sent to the base station for requesting the base station to unicast the corresponding SI, thereby improving a success rate of receiving. In addition, the number-of-decoding-failures for the piece of the to-be-requested SI in the corresponding receiving window may be counted, and when the number-of-decoding-failures reaches the number-of-decoding-failures threshold, it is determined that the piece of the to-be-requested SI is not successfully received. In this way, the second SI request is sent to the base station for requesting the base station to unicast the corresponding SI, thereby improving the success rate of receiving.

Figure 5A:
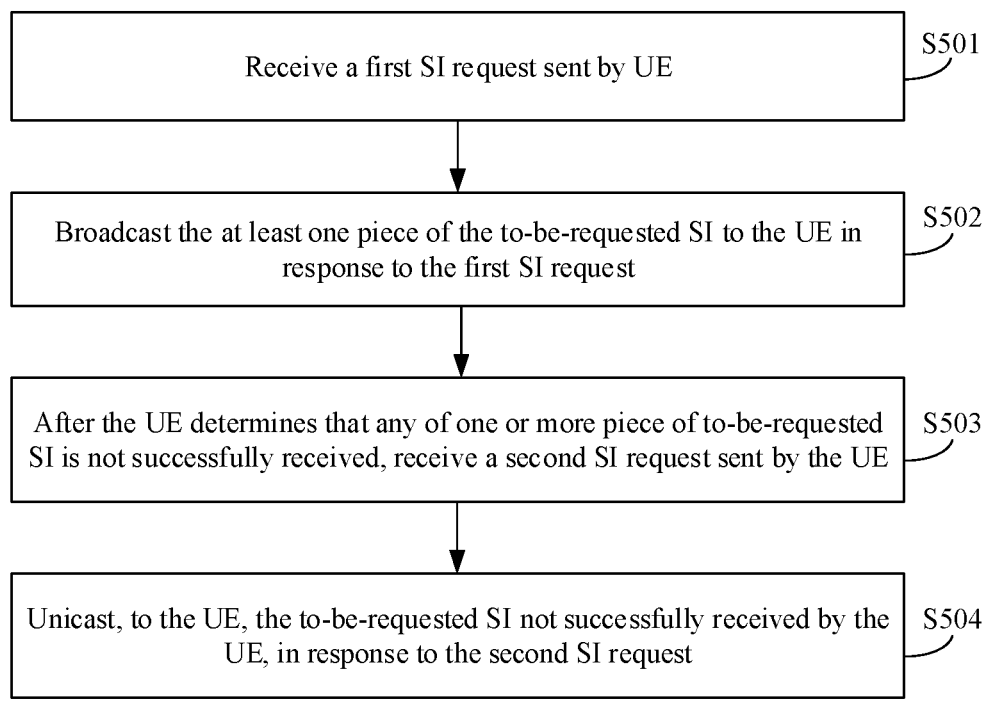
FIG. 5A is a flowchart illustrating a method of sending SI according to an example of the present application.

FIG. 5A is a flowchart illustrating a method of sending SI according to an example of the present application, which is described from a base station side. As shown in FIG. 5A, the method of sending the SI includes the followings.

At step S501, a first SI request is received from UE, where the first SI request is for the UE to request the present base station to broadcast at least one piece of to-be-requested SI, and the at least one piece of the to-be-requested SI belongs to second type SI which has not been broadcasted by the present base station.

Figure 5B:
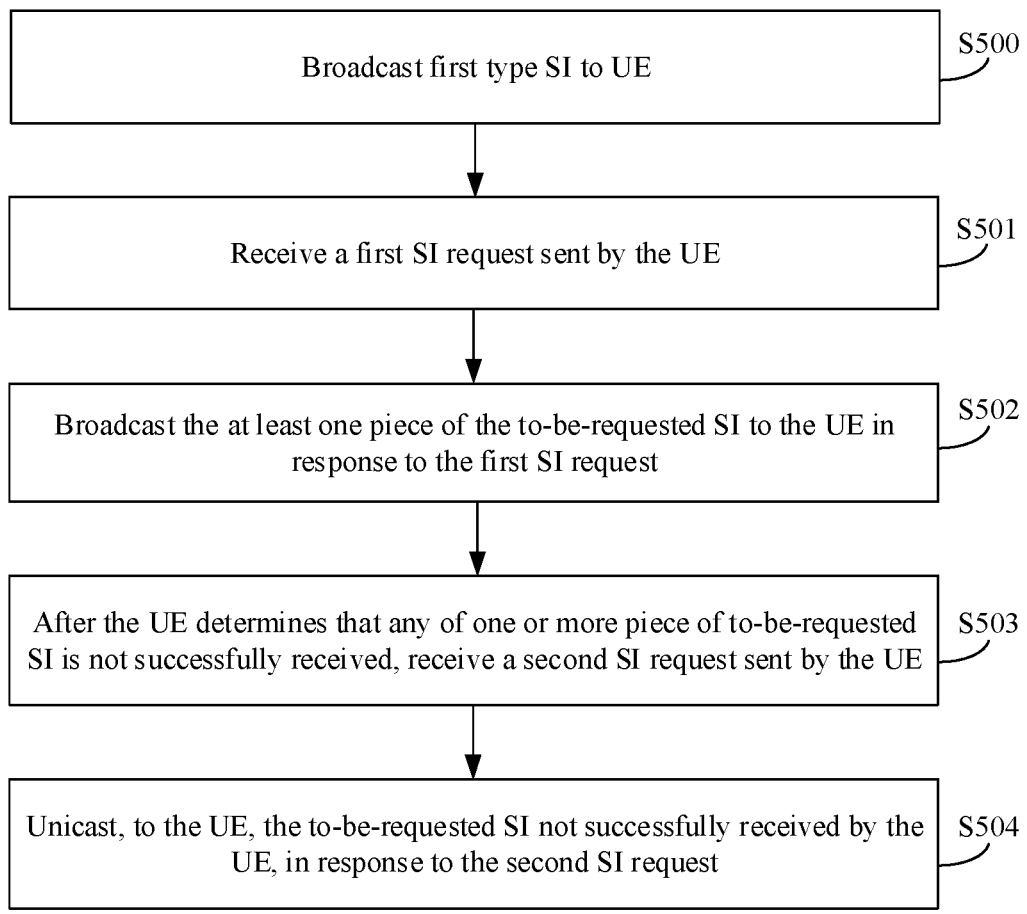
FIG. 5B is a flowchart illustrating another method for sending SI according to an example of the present application.

In addition, as shown in FIG. 5B, prior to step S501, the method may further include:

at step S500, first type SI is broadcasted to the UE, where the first type SI carries the second type SI which has not been broadcasted by the present base station.

In addition, the first type SI may further carry indication information. The indication information may include at least one of the followings: a respective number-of-requests corresponding to each piece of the second type SI, indicated uniformly or separately; a respective number-of-monitoring-windows corresponding to each piece of the second type SI, indicated uniformly or separately; a respective number-of-decoding-failures corresponding to each piece of the second type SI, indicated uniformly or separately; or second type SI that can be converted to be unicasted.

At step S502, the at least one piece of the to-be-requested SI is broadcasted to the UE in response to the first SI request.

At step S503, after the UE determines that any of one or more pieces of to-be-requested SI is not successfully received, a second SI request is received from the UE, where the second SI request is for the UE to request the base station to unicast the to-be-requested SI not successfully received by the UE.

At step S504, the to-be-requested SI not successfully received by the UE is unicasted to the UE in response to the second SI request.

In the example, after the UE determines that any of one or more pieces of to-be-requested SI is not successfully received, the second SI request is received from the UE, and the to-be-requested SI which is not successfully received by the present UE is unicasted to the UE in response to the second SI request, so that the UE may successfully acquire corresponding to-be-requested SI.

Figure 6:
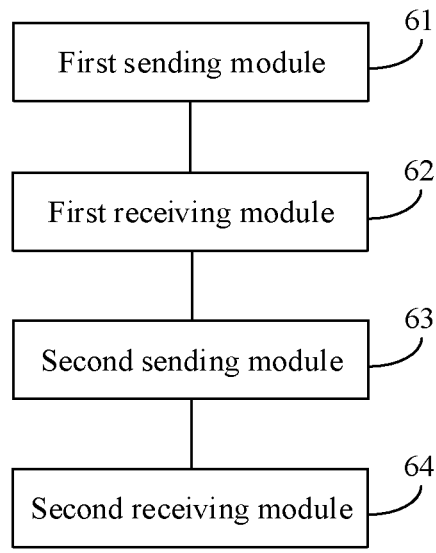
FIG. 6 is a block diagram illustrating an apparatus for receiving SI according to an example.

FIG. 6 is a block diagram illustrating an apparatus for receiving SI according to an example. As shown in FIG. 6, the apparatus includes a first sending module 61, a first receiving module 62, a second sending module 63 and a second receiving module 64.

The first sending module 61 is configured to send a first SI request to a base station, where the first SI request is for requesting the base station to broadcast at least one piece of to-be-requested SI, and the at least one piece of the to-be-requested SI belongs to second type SI which has not been broadcasted.

In the example, the first type SI may be Minimum SI, and the second type SI may be one or more pieces of SI other than the Minimum SI, e.g., other SI. The base station may carry the second type SI which has not been broadcasted in the first type SI, where the first type SI is broadcasted by the base station. Thus, when the UE is to acquire one or some pieces of the second type SI that are not broadcasted, the UE can send the first SI request to the base station for requesting the base station to broadcast at least one piece of to-be-requested SI.

The first receiving module 62 is configured to receive, according to pre-acquired scheduling information, the at least one piece of the to-be-requested SI broadcasted by the base station in response to the first SI request sent by the first sending module 61.

The UE can acquire scheduling information in a manner of agreement with the base station, and according to the scheduling information, receive the at least one piece of the to-be-requested SI broadcasted by the base station in response to the first SI request.

The second sending module 63 is configured to, after the first receiving module 62 receives the at least one piece of the to-be-requested SI, when it is determined that any of one or more pieces of the to-be-requested SI is not successfully received, send a second SI request to the base station, where the second SI request is for requesting the base station to unicast to-be-requested SI not successfully received by present UE.

If the UE does not successfully receive any of the one or more piece of the to-be-requested SI, the second SI request can be sent to the base station for requesting the base station to unicast the to-be-requested SI not successfully received by the present UE. The UE may carry the second SI request in a connection establishment request or in a preamble sequence sent to the base station.

In the example, the second SI request can indicate the base station to send the to-be-requested SI in a unicast manner. For example, it is possible to separately indicate for each piece of the to-be-requested SI or uniformly indicate for all pieces of the to-be-requested SI.

In addition, if the indication information includes second type SI that can be converted to be unicasted, the UE is to confirm whether the to-be-requested SI which is not successfully received by the present UE belongs to the second type SI that can be converted to be unicasted, and if the to-be-requested SI which is not successfully received by the present UE belongs to the second type SI that can be converted to be unicasted, the second SI request can be sent to the base station.

The second receiving module 64 is configured to receive the to-be-requested SI not successfully received by the present UE, which is unicasted by the base station in response to the second SI request sent by the second sending module 63.

After receiving the second SI request carried in the preamble sequence or the connection establishment request from the UE, the base station can send the UE the to-be-requested SI which is not successfully received by the present UE in a corresponding response message.

In the example, after it is determined that any of one or more pieces of to-be-requested SI broadcasted by the base station is not successfully received, the second SI request is sent to the base station, so that the base station can unicast to-be-requested SI not successfully received by the present UE in response to the second SI request, and the UE may thereby successfully acquire the corresponding to-be-requested SI.

Figure 7:
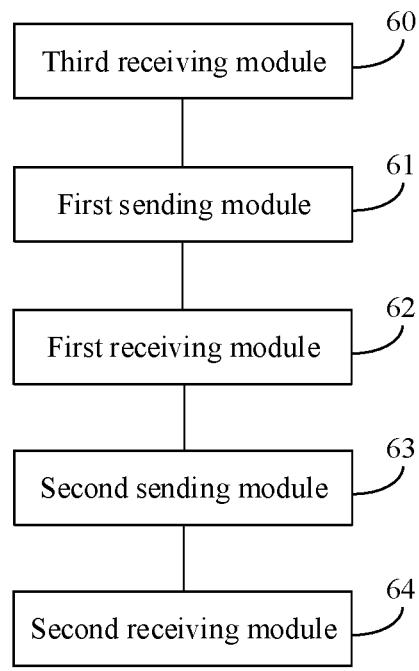
FIG. 7 is a block diagram illustrating another apparatus for receiving SI according to an example.

FIG. 7 is a block diagram illustrating another apparatus for receiving SI according to an example. As shown in FIG. 7, on the basis of the example shown in FIG. 6, the apparatus may further include: a third receiving module 60.

The third receiving module 60 is configured to, before the first sending module 61 sends the first SI request, receive first type SI broadcasted by the base station, where the first type SI carries the second type SI which has not been broadcasted.

In addition, the first type SI may further carry indication information. The indication information may include at least one of the followings: a respective number-of-requests corresponding to each piece of the second type SI, indicated uniformly or separately; a respective number-of-monitoring-windows corresponding to each piece of the second type SI, indicated uniformly or separately; a respective number-of-decoding-failures corresponding to each piece of the second type SI, indicated uniformly or separately; or second type SI that can be converted to be unicasted.

In the example, the second type SI which has not been broadcasted by the base station may obtained by receiving the first type SI broadcasted by the base station, so that the UE may request the second type SI which has not been broadcasted from the base station easily.

Figure 8A:
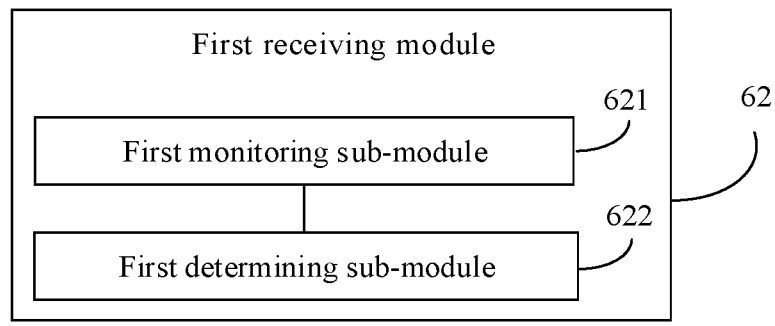
FIG. 8A is a block diagram illustrating another apparatus for receiving SI according to an example.

FIG. 8A is a block diagram illustrating another apparatus for receiving SI according to an example. As shown in FIG. 8A, on the basis of the example shown in FIG. 7, the scheduling information may include a position of an initial monitoring window and a number-of-windows, and the first receiving module 62 may include a first monitoring sub-module 621 and a first determining sub-module 622.

The first monitoring sub-module 621 is configured to, for each piece of the to-be-requested SI, continuously monitor a number-of-windows of receiving windows corresponding to the piece of the to-be-requested SI from an initial monitoring window corresponding to a position of an initial monitoring window for the piece of the to-be-requested SI.

For each piece of SI, a position of an initial monitoring window and a number-of-windows may be agreed by the UE and the base station.

In addition, if the first type SI carries the indication information, the number-of-windows may be equal to the number-of-monitoring-windows in the indication information.

It is assumed that the to-be-requested SI includes SI 1 and SI 2, and the number-of-windows is 5. For SI 1, 5 receiving windows may be continuously monitored from an initial monitoring window corresponding to a position of an initial monitoring window of SI 1. For SI 2, 5 receiving windows may be continuously monitored from an initial monitoring window corresponding to a position of an initial monitoring window of SI 2.

The first determining sub-module 622 is configured to, when the piece of the to-be-requested SI is not received by the first monitoring sub-module within the receiving windows continuously monitored, determine that the piece of the to-be-requested SI is not successfully received.

The description continues based on the above example. If SI 1 is not received within 5 receiving windows, it is determined that SI 1 is not successfully received. If SI 2 is not received within 5 receiving windows, it is determined that SI 2 is not successfully received.

According to the example, the to-be-requested SI is received by the receiving windows continuously monitored, if the to-be-requested SI is not successfully received, the second SI request is sent to the base station for requesting the base station to unicast the corresponding SI, thereby improving a success rate of receiving.

Figure 8B:
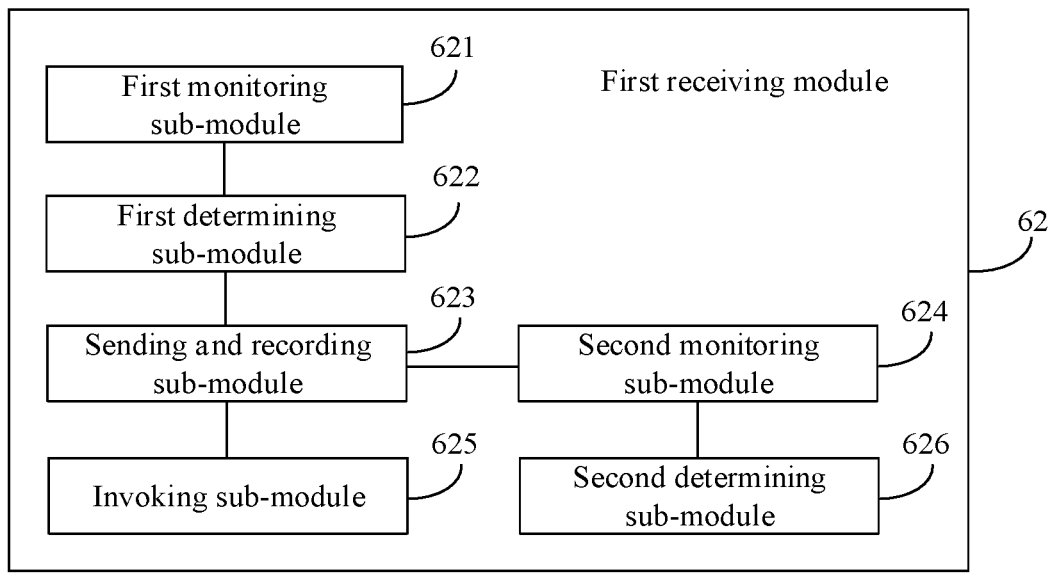
FIG. 8B is a block diagram illustrating another apparatus for receiving SI according to an example.

FIG. 8B is a block diagram illustrating another apparatus for receiving SI according to an example. As shown in FIG. 8B, on the basis of the example shown in FIG. 8A, the scheduling information may further include a number-of-requests threshold, and the first receiving module 62 may further include: a sending and recording sub-module 623, a second monitoring sub-module 624, an invoking sub-module 625 and a second determining sub-module 626.

The sending and recording sub-module 623 is configured to, after the first determining sub-module determines that the piece of the to-be-requested SI is not successfully received, send a third SI request to the base station and record a number of requests, where the third SI request is for requesting the base station to broadcast the piece of the to-be-requested SI.

The second monitoring sub-module 624 is configured to continuously monitor the number-of-windows of receiving windows corresponding to the piece of the to-be-requested SI from the initial monitoring window corresponding to the position of the initial monitoring window for the piece of the to-be-requested SI.

The invoking sub-module 625 is configured to, when the number of requests recorded by the sending and recording sub-module 623 does not reach the number-of-requests threshold and the piece of the to-be-requested SI is not received by the second monitoring sub-module 624 within the receiving windows continuously monitored, invoke the sending and recording sub-module 623 to send the third SI request to the base station repeatedly.

The second determining sub-module 626 is configured to, when the number of requests recorded by the sending and recording sub-module 623 reaches the number-of-requests threshold and the piece of the to-be-requested SI is not received yet by the second monitoring sub-module 624 within the receiving windows continuously monitored, determine that the piece of the to-be-requested SI is not successfully received.

In the example, the third SI request is sent to the base station and the to-be-requested SI is received by continuously monitoring the receiving windows, Thus, if the number of requests reaches the number-of-requests threshold and the to-be-requested SI is not successfully received yet, the second SI request is sent to the base station for requesting the base station to unicast the corresponding SI, thereby improving a success rate of receiving.

Figure 8C:
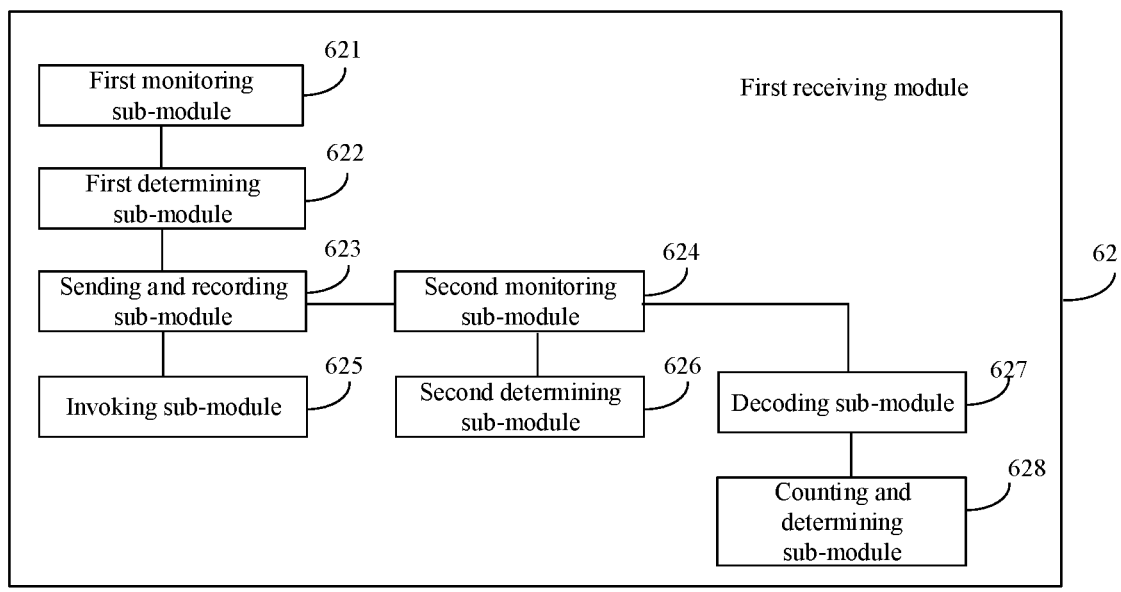
FIG. 8C is a block diagram illustrating another apparatus for receiving SI according to an example.

FIG. 8C is a block diagram illustrating another apparatus for receiving SI according to an example. As shown in FIG. 8C, on the basis of the example shown in FIG. 8A or 8B, the scheduling information may further include a number-of-decoding-failures threshold, and the first receiving module 62 may further include: a decoding sub-module 627 and a counting and determining sub-module 628.

The decoding sub-module 627 is configured to, when the piece of the to-be-requested SI is received within the receiving windows continuously monitored, decode the piece of the to-be-requested SI within a corresponding receiving window.

The counting and determining sub-module 628 is configured to count failures of decoding the piece of the to-be-requested SI within the corresponding receiving window by the decoding sub-module 627 and, when the number of the failures reaches the number-of-decoding-failures threshold, determine that the piece of the to-be-requested SI is not successfully received.

In the example, the number-of-decoding-failures for the piece of the to-be-requested SI in the corresponding receiving window is counted, and when the number-of-decoding-failures reaches the number-of-decoding-failures threshold, it is determined that the piece of the to-be-requested SI is not successfully received. And then the second SI request is sent to the base station for requesting the base station to unicast the corresponding SI, thereby improving a success rate of receiving.

Figure 9:
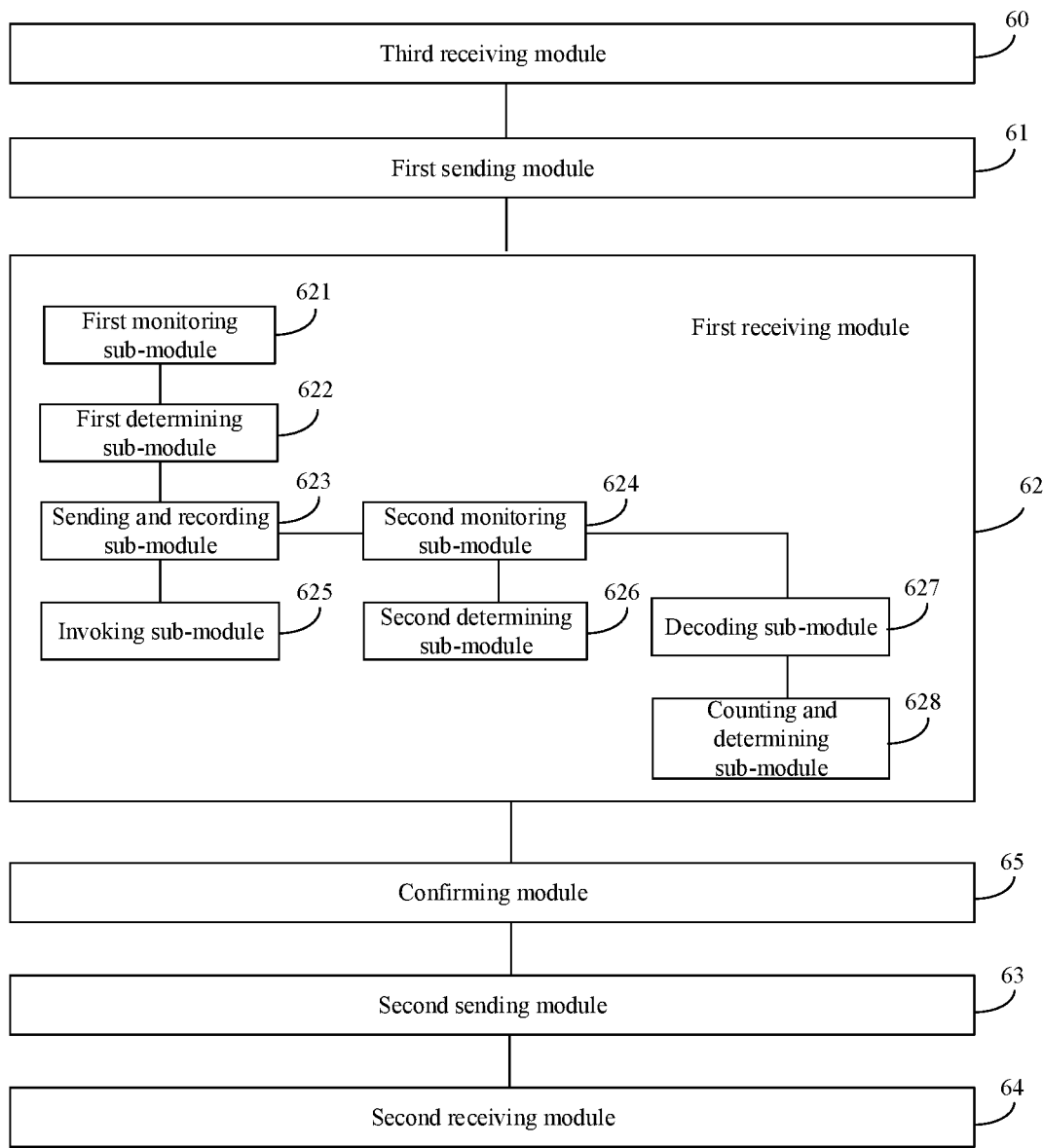
FIG. 9 is a block diagram illustrating another apparatus for receiving SI according to an example.

FIG. 9 is a block diagram illustrating another apparatus for receiving SI according to an example. As shown in FIG. 9, on the basis of the example shown in FIG. 8C, if the indication information includes the second type SI that can be converted to be unicasted, the apparatus may further include: a confirming module 65.

The confirming module 65 is configured to, before the second sending module sends the second SI request to the base station, confirm that the to-be-requested SI not successfully received by the present UE belongs to the second type SI that can be converted to be unicasted.

In addition, if the indication information includes second type SI that can be converted to be unicasted, the UE is to confirm whether the to-be-requested SI which is not successfully received by the present UE belongs to the second type SI that can be converted to be unicasted, and if the to-be-requested SI which is not successfully received by the present UE belongs to the second type SI that can be converted to be unicasted, the second SI request may be sent to the base station.

In the example, after it is determined that the to-be-requested SI not successfully received by the present UE belongs to the second type SI that can be converted to be unicasted, the second SI request is sent to the base station, so as to improve a success rate of requesting the base station to unicast the to-be-requested SI.

Figure 10:
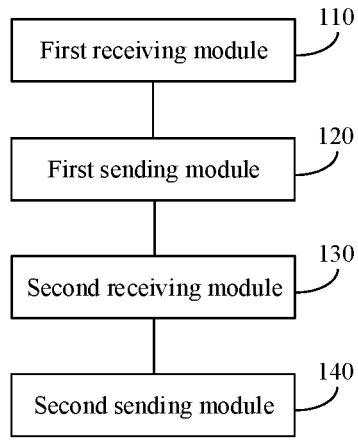
FIG. 10 is a block diagram illustrating an apparatus for sending SI according to an example.

FIG. 10 is a block diagram illustrating an apparatus for sending SI according to an example. As shown in FIG. 10, the apparatus for sending the SI includes: a first receiving module 110, a first sending module 120, a second receiving module 130, and a second sending module 140.

The first receiving module 110 is configured to receive a first SI request sent by UE, where the first SI request is for the UE to request the present base station to broadcast at least one piece of to-be-requested SI, and the at least one piece of the to-be-requested SI belongs to second type SI which has not been broadcasted by the present base station.

The first sending module 120 is configured to broadcast the at least one piece of the to-be-requested SI to the UE in response to the first SI request received by the first receiving module 110.

The second receiving module 130 is configured to receive a second SI request, which is sent by the UE after the UE determines that any of one or more pieces of to-be-requested SI which is sent by the first sending module 120 is not successfully received, where the second SI request is for the UE to request the base station to unicast the to-be-requested SI not successfully received by the UE.

The second sending module 140 is configured to unicast, to the UE, the to-be-requested SI not successfully received by the UE, in response to the second SI request received by the second receiving module 130.

after it is determined that any of one or more pieces of to-be-requested SI is not successfully received, the second SI request is received from the UE, and the to-be-requested SI which is not successfully received by the present UE is unicasted to the UE in response to the second SI request, so that the UE may successfully acquire corresponding to-be-requested SI.

Figure 11:
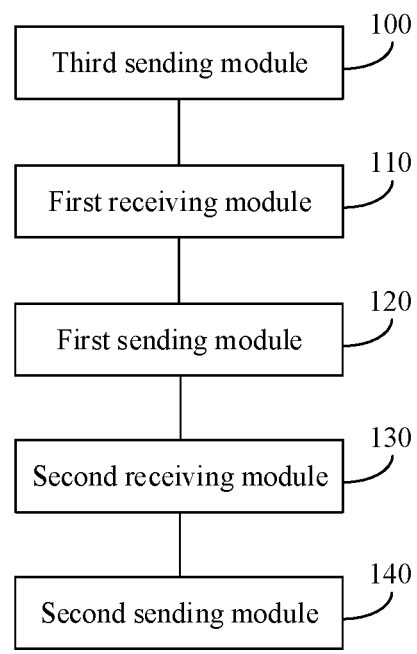
FIG. 11 is a block diagram illustrating another apparatus for sending SI according to an example.

FIG. 11 is a block diagram illustrating another apparatus for sending SI according to an example. As shown in FIG. 11, on the basis of the example shown in FIG. 10, the apparatus may further include: a third sending module 100.

The third sending module 100 is configured to, before the first receiving module 110 receives the first SI request, broadcast, to the UE, first type SI carrying the second type SI which has not been broadcasted by the present base station.

In addition, the first type SI may further carry indication information. The indication information may include at least one of the followings: a respective number-of-requests corresponding to each piece of the second type SI, indicated uniformly or separately; a respective number-of-monitoring-windows corresponding to each piece of the second type SI, indicated uniformly or separately; a respective number-of-decoding-failures corresponding to each piece of the second type SI, indicated uniformly or separately; or second type SI that can be converted to be unicasted.

In the above example, the first type SI is broadcasted to the UE, so that the UE may obtain the second type SI which has not been broadcasted by the base station, and thereby the UE may request the second type SI which has not been broadcasted SI from the base station easily.

Figure 12:
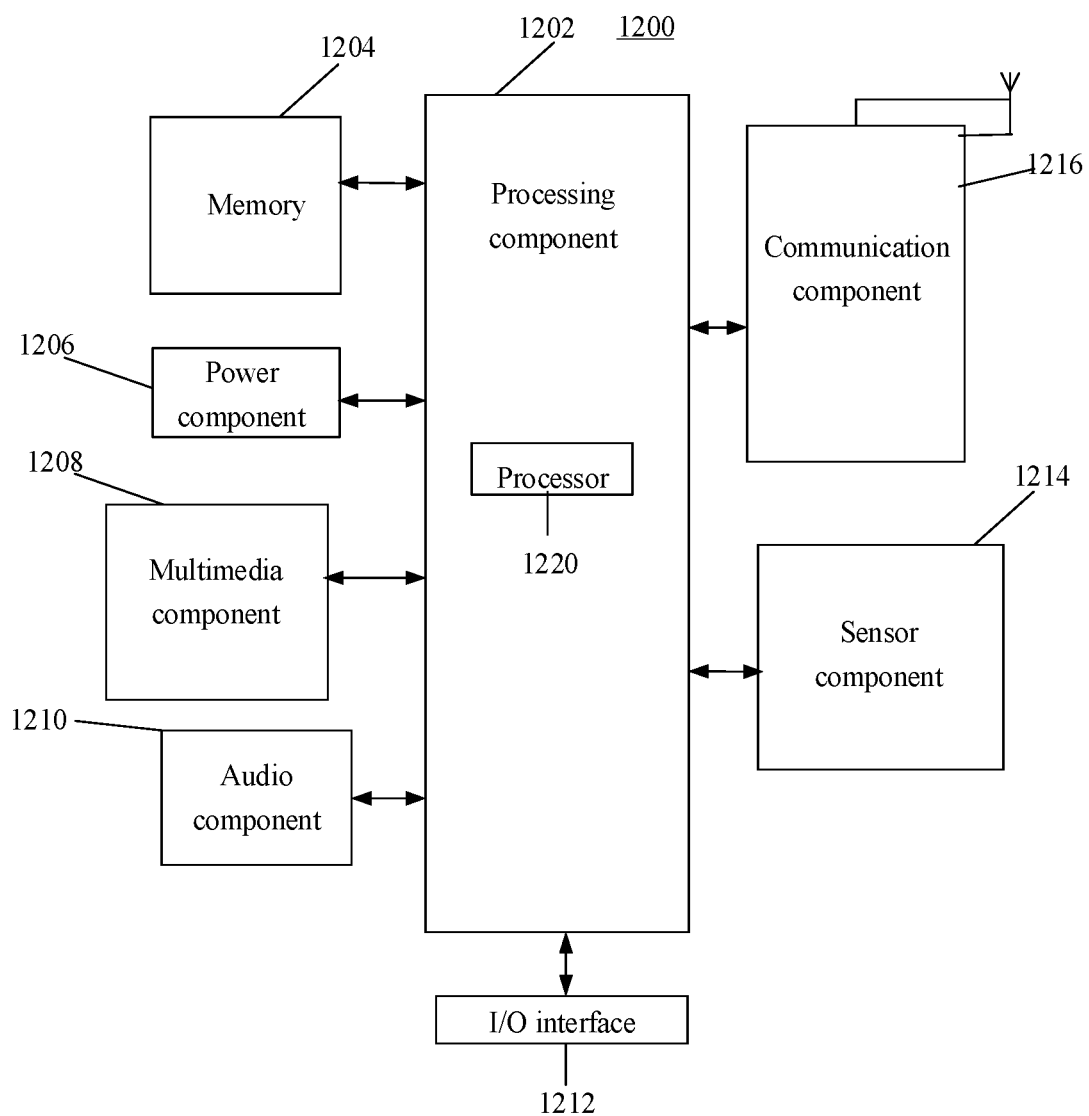
FIG. 12 is a block diagram illustrating an apparatus suitable for receiving SI according to an example.

FIG. 12 is a block diagram illustrating an apparatus suitable for receiving SI according to an example. For example, an apparatus 1200 may be a mobile phone, a computer, a digital broadcast terminal, a message receiving and transmitting device, a game console, a tablet device, a medical device, a fitness device, a personal digital assistant, and so on.

Referring to FIG. 12, the apparatus 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 generally controls overall operations of the apparatus 1200, such as operations associated with display, phone calls, data communications, camera operations, and recording operations. The processing component 1202 may include one or more processors 1220 to execute instructions to complete all or part of the steps of the above methods. In addition, the processing component 1202 may include one or more modules which facilitate the interaction between the processing component 1202 and other components. For example, the processing component 1202 may include a multimedia module to facilitate the interaction between the multimedia component 1208 and the processing component 1202.

The memory 1204 is to store various types of data to support the operation of the apparatus 1200. Examples of such data include instructions for any application or method operated on the apparatus 1200, contact data, phonebook data, messages, pictures, videos, and so on. The memory 1204 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 1206 provides power to different components of the apparatus 1200. The power component 1206 may include a power management system, one or more power supplies, and other components associated with generating, managing, and distributing power for the apparatus 1200.

The multimedia component 1208 includes a screen providing an output interface between the apparatus 1200 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 1208 may include a front camera and/or a rear camera. The front camera and/or rear camera may receive external multimedia data when the apparatus 1200 is in an operating mode, such as a photographing mode or a video mode. Each of the front camera and the rear camera may be a fixed optical lens system or have focal length and optical zooming capability.

The audio component 1210 is to output and/or input an audio signal. For example, the audio component 1210 includes a microphone (MIC). When the apparatus 1200 is in an operating mode, such as a call mode, a recording mode, and a voice recognition mode, the MIC is to receive an external audio signal. The received audio signal may be further stored in the memory 1204 or sent via the communication component 1216. In some examples, the audio component 1210 further includes a speaker to output an audio signal.

The I/O interface 1212 may provide interfaces between the processing component 1202 and peripheral interface modules. The peripheral interface modules may include a keyboard, a click wheel, buttons and so on. These buttons may include, but are not limited to, a home button, a volume button, a starting button and a locking button.

The sensor component 1214 includes one or more sensors to provide status assessments of various aspects for the apparatus 1200. For example, the sensor component 1214 may detect the on/off status of the apparatus 1200, and relative positioning of component, for example, the component is a display and a keypad of the apparatus 1200. The sensor component 1214 may also detect a change in position of the apparatus 1200 or a component of the apparatus 1200, a presence or absence of the contact between a user and the apparatus 1200, an orientation or an acceleration/deceleration of the apparatus 1200, and a change in temperature of the apparatus 1200. The sensor component 1214 may include a proximity sensor to detect the presence of a nearby object without any physical contact. The sensor component 1214 may further include an optical sensor, such as a Complementary Metal-Oxide-Semiconductor (CMOS) or Charged Coupled Device (CCD) image sensor which is used in imaging applications. In some examples, the sensor component 1214 may further include an acceleration sensor, a gyroscope sensor, a magnetic sensor, a pressure sensor, or a temperature sensor.

The communication component 1216 is to facilitate wired or wireless communication between the apparatus 1200 and other devices. The apparatus 1200 may access a wireless network that is based on a communication standard, such as Wi-Fi, 2G or 3G, or a combination thereof. In an example, the communication component 1216 receives a broadcast signal or broadcast-associated information from an external broadcast management system via a broadcast channel. In an example, the communication component 1216 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth® (BT) technology and other technologies.

In an example, the apparatus 1200 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In an example, there is also provided a non-transitory computer-readable storage medium including instructions, such as a memory 1204 including instructions. The above instructions may be executed by the processor 1220 of the apparatus 1200 to complete the above method. For example, the non-transitory computer-readable storage medium may be a Read-Only Memory (ROM), a Random Access Memory (RAM), CD-ROM, a magnetic tape, a floppy disk, and an optical data storage device and so on.

Figure 13:
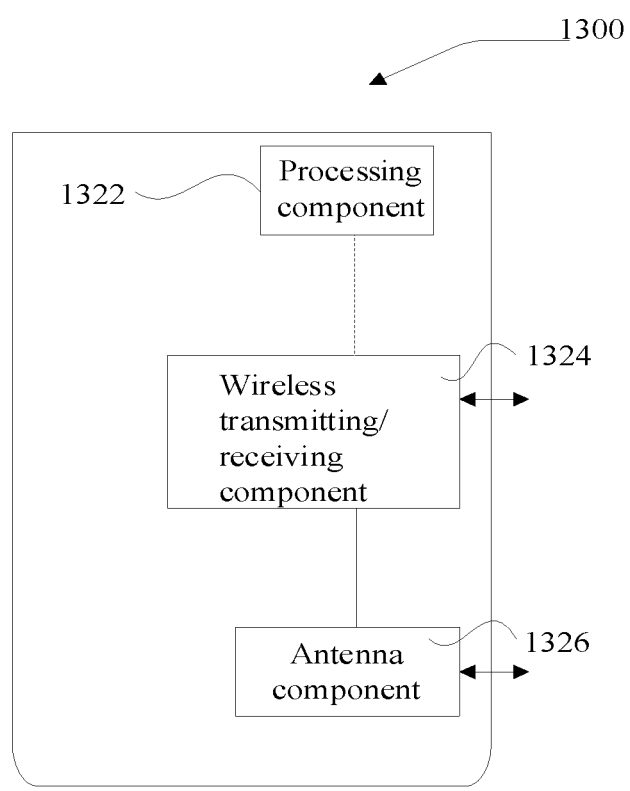
FIG. 13 is a block diagram illustrating another apparatus suitable for sending SI according to an example.

FIG. 13 is a block diagram illustrating another apparatus suitable for sending SI according to an example. An apparatus 1300 may be provided as a base station. Referring to FIG. 13, the apparatus 1300 includes a processing component 1322, a wireless transmitting/receiving component 1324, an antenna component 1326, and a signal processing portion specific to a wireless interface. The processing component 1322 may further include one or more processors.

One the processor of the processing component 1322 may be configured to:

receive a first SI request sent by UE, where the first SI request is for the UE to request the present base station to broadcast at least one piece of to-be-requested SI, and the at least one piece of the to-be-requested SI belongs to second type SI which has not been broadcasted by the base station;

broadcast the at least one piece of the to-be-requested SI to the UE in response to the first SI request;

receive a second SI request, which is sent by the UE after the UE determines that any of one or more pieces of to-be-requested SI is not successfully received, where the second SI request is for the UE to request the base station to unicast the to-be-requested SI not successfully received by the UE; and unicast, to the UE, the to-be-requested SI not successfully received by the UE, in response to the second SI request.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, e.g., may be located in one place, or may be distributed to a plurality of network units. Part or all of the modules may be selected according to actual requirements to implement the objectives of the solutions in the examples. Those of ordinary skill in the art may understand and carry out them without creative work.

It should be noted that, in this context, relational terms such as "first" and "second" are used merely to distinguish one entity or operation from the other entity or operation, and do not necessarily require or imply the existence of any actual relationship or order between these entities or operations. The terms "comprising", "including" or any other variants thereof are intended to cover non-exclusive inclusion, such that processes, methods, articles, or devices including a series of elements includes not only those elements but also other elements not specifically listed, or further includes elements inherent to such processes, methods, articles, or devices. Under the circumstance of no more limitation, an element limited by the phrase "comprising a . . ." does not exclude the presence of additional equivalent elements in the processes, methods, articles, or devices that includes the element.

The method and apparatus provided by the examples of the present disclosure are described above in detail. Specific examples are used herein to explain the principles and embodiments of the present disclosure. The description of the above examples is only for helping to understand the method according to the present disclosure and its core idea. At the same time, for those skilled in the art, in accordance with the idea of the present disclosure, there will be changes in specific embodiments and application scope. In summary, the contents of this specification should not be construed as a limitation to the present disclosure.

The invention claimed is:

1. A method of receiving system information (SI), comprising:
    sending a first SI request to a base station, wherein the first SI request is for requesting the base station to broadcast at least one piece of to-be-requested SI, and the at least one piece of the to-be-requested SI belongs to second type SI which has not been broadcasted;
    receiving, according to pre-acquired scheduling information, the at least one piece of the to-be-requested SI broadcasted by the base station in response to the first SI request;
    when it is determined that any of one or more pieces of the to-be-requested SI is not successfully received, sending a second SI request to the base station, wherein the second SI request is for requesting the base station to unicast to-be-requested SI not successfully received by present user equipment (UE); and
    receiving the to-be-requested SI not successfully received by the present UE, which is unicasted by the base station in response to the second SI request.

2. The method according to claim 1, further comprising:
    receiving first type SI broadcasted by the base station, wherein the first type SI carries the second type SI which has not been broadcasted.

3. The method according to claim 2, wherein the scheduling information comprises a position of an initial monitoring window and a number-of-windows, and
    receiving, according to the pre-acquired scheduling information, the at least one piece of the to-be-requested SI broadcasted by the base station in response to the first SI request comprises:
    for each piece of the to-be-requested SI, continuously monitoring a number-of-windows of receiving windows corresponding to the piece of the to-be-requested SI from an initial monitoring window corresponding to a position of an initial monitoring window for the piece of the to-be-requested SI; and
    when the piece of the to-be-requested SI is not received within the receiving windows continuously monitored, determining that the piece of the to-be-requested SI is not successfully received.

4. The method according to claim 3, wherein the scheduling information further comprises a number-of-requests threshold, and
    receiving, according to the pre-acquired scheduling information, the at least one piece of the to-be-requested SI broadcasted by the base station in response to the first SI request further comprises:
    after determining that the piece of the to-be-requested SI is not successfully received, sending a third SI request to the base station and recording a number of requests, wherein the third SI request is for requesting the base station to broadcast the piece of the to-be-requested SI;
    continuously monitoring the number-of-windows of receiving windows corresponding to the piece of the to-be-requested SI from the initial monitoring window corresponding to the position of the initial monitoring window for the piece of the to-be-requested SI;
    when the recorded number of requests does not reach the number-of-requests threshold and the piece of the to-be-requested SI is not received within the receiving windows continuously monitored, repeatedly performing the operation of sending the third SI request to the base station; and
    when the recorded number of requests reaches the number-of-requests threshold and the piece of the to-be-requested SI is not received yet within the receiving windows continuously monitored, determining that the piece of the to-be-requested SI is not successfully received.

5. The method according to claim 3, wherein the scheduling information further comprises a number-of-decoding-failures threshold, and
    receiving, according to the pre-acquired scheduling information, the at least one piece of the to-be-requested SI broadcasted by the base station in response to the first SI request further comprises:
    when the piece of the to-be-requested SI is received within the receiving windows continuously monitored, decoding the piece of the to-be-requested SI within a corresponding receiving window; and
    counting failures of decoding the piece of the to-be-requested SI within the corresponding receiving window and, when the number of the failures reaches the number-of-decoding-failures threshold, determining that the piece of the to-be-requested SI is not successfully received.

6. The method according to claim 5, wherein the first type SI further carries indication information comprising at least one of:

a respective number-of-requests corresponding to each piece of the second type SI, indicated uniformly or separately;

a respective number-of-monitoring-windows corresponding to each piece of the second type SI, indicated uniformly or separately;

a respective number-of-decoding-failures corresponding to each piece of the second type SI, indicated uniformly or separately; or second type SI that can be converted to be unicasted.

7. The method according to claim 6, wherein the number-of-windows is agreed by the base station and the present UE or is equal to the number-of-monitoring-windows in the indication information;

a number-of-requests threshold is agreed by the base station and the present UE or is equal to the number-of-requests in the indication information; and the number-of-decoding-failures threshold is agreed by the base station and the present UE or is equal to the number-of-decoding-failures in the indication information.

8. The method according to claim 6, wherein when the indication information comprises the second type SI that can be converted to be unicasted, prior to sending the second SI request to the base station, the method further comprises:

confirming that the to-be-requested SI not successfully received by the present UE belongs to the second type SI that can be converted to be unicasted.

9. User equipment (UE), comprising:

a processor; and a memory storing instructions executable by the processor, wherein the processor is configured to:

send a first SI request to a base station, wherein the first SI request is for requesting the base station to broadcast at least one piece of to-be-requested SI, and the at least one piece of the to-be-requested SI belongs to second type SI which has not been broadcasted;

receive, according to pre-acquired scheduling information, the at least one piece of the to-be-requested SI broadcasted by the base station in response to the first SI request;

when it is determined that any of one or more pieces of the to-be-requested SI is not successfully received, sending a second SI request to the base station, wherein the second SI request is for requesting the base station to unicast to-be-requested SI not successfully received by the UE; and receive the to-be-requested SI not successfully received by the UE, which is unicasted by the base station in response to the second SI request.

10. The UE according to claim 9, wherein the processor is further configured to:

receive first type SI broadcasted by the base station, wherein the first type SI carries the second type SI which has not been broadcasted.

11. The UE according to claim 10, wherein:

the scheduling information comprises a position of an initial monitoring window and a number-of-windows, and the receiving, according to the pre-acquired scheduling information, the at least one piece of the to-be-requested SI broadcasted by the base station in response to the first SI request comprises:

for each piece of the to-be-requested SI, continuously monitoring a number-of-windows of receiving windows corresponding to the piece of the to-be-requested SI from an initial monitoring window corresponding to a position of an initial monitoring window for the piece of the to-be-requested SI; and when the piece of the to-be-requested SI is not received within the receiving windows continuously monitored, determining that the piece of the to-be-requested SI is not successfully received.

12. The UE according to claim 11, wherein the scheduling information further comprises a number-of-requests threshold, and receiving, according to the pre-acquired scheduling information, the at least one piece of the to-be-requested SI broadcasted by the base station in response to the first SI request further comprises:

after determining that the piece of the to-be-requested SI is not successfully received, sending a third SI request to the base station and recording a number of requests, wherein the third SI request is for requesting the base station to broadcast the piece of the to-be-requested SI;

continuously monitoring the number-of-windows of receiving windows corresponding to the piece of the to-be-requested SI from the initial monitoring window corresponding to the position of the initial monitoring window for the piece of the to-be-requested SI;

upon that the recorded number of requests does not reach the number-of-requests threshold and the piece of the to-be-requested SI is not received within the receiving windows continuously monitored, repeatedly performing the operation of sending the third SI request to the base station; and when the recorded number of requests reaches the number-of-requests threshold and the piece of the to-be-requested SI is not received yet within the receiving windows continuously monitored, determining that the piece of the to-be-requested SI is not successfully received.

13. The UE according to claim 11, wherein:

the scheduling information further comprises a number-of-decoding-failures threshold, and the receiving, according to the pre-acquired scheduling information, the at least one piece of the to-be-requested SI broadcasted by the base station in response to the first SI request further comprises:

upon that the piece of the to-be-requested SI is received within the receiving windows continuously monitored, decoding the piece of the to-be-requested SI within a corresponding receiving window; and counting failures of decoding the piece of the to-be-requested SI within the corresponding receiving window and, when the number of the failures reaches the number-of-decoding-failures threshold, determining that the piece of the to-be-requested SI is not successfully received.

14. The UE according to claim 13, wherein the first type SI further carries indication information comprising at least one of:

a respective number-of-requests corresponding to each piece of the second type SI, indicated uniformly or separately;

a respective number-of-monitoring-windows corresponding to each piece of the second type SI, indicated uniformly or separately;

a respective number-of-decoding-failures corresponding to each piece of the second type SI, indicated uniformly or separately; or second type SI that can be converted to be unicasted.

15. The UE according to claim 14, wherein the number-of-windows is agreed by the base station and the UE or is equal to the number-of-monitoring-windows in the indication information;
- a number-of-requests threshold is agreed by the base station and the UE or is equal to the number-of-requests in the indication information; and
- the number-of-decoding-failures threshold is agreed by the base station and the UE or is equal to the number-of-decoding-failures in the indication information.

16. The UE according to claim 14, wherein when the indication information comprises the second type SI that can be converted to be unicasted, prior to sending the second SI request to the base station, the processor is further configured to:
- confirm that the to-be-requested SI not successfully received by the UE belongs to the second type SI that can be converted to be unicasted.

* * * * *